(12) United States Patent
Kurosawa

(10) Patent No.: US 7,352,404 B2
(45) Date of Patent: Apr. 1, 2008

(54) DIGITAL CAMERA INCLUDING DEFOCUS PREVENTION

(75) Inventor: Yuichi Kurosawa, Tokyo (JP)

(73) Assignee: Pentax Corporation, Tokyo (JP)

( * ) Notice: Subject to any disclaimer, the term of this patent is extended or adjusted under 35 U.S.C. 154(b) by 526 days.

(21) Appl. No.: 11/042,175

(22) Filed: Jan. 26, 2005

(65) Prior Publication Data

US 2005/0162538 A1 Jul. 28, 2005

(30) Foreign Application Priority Data

Jan. 27, 2004 (JP) ............................. 2004-018076

(51) Int. Cl.
*G03B 13/00* (2006.01)
*H04N 5/225* (2006.01)
(52) U.S. Cl. ...................... 348/357; 348/374
(58) Field of Classification Search ............... 348/357, 348/374
See application file for complete search history.

(56) References Cited

U.S. PATENT DOCUMENTS

| | | | |
|---|---|---|---|
| 5,369,456 A | 11/1994 | Yokota | |
| 6,583,819 B2 | 6/2003 | Ito et al. | |
| 6,665,016 B2 | 12/2003 | Saitoh | |
| 6,741,284 B1 | 5/2004 | Shono | |
| 7,140,788 B2 * | 11/2006 | Kurosawa | 396/354 |
| 2004/0121503 A1 * | 6/2004 | Ferland et al. | 438/48 |
| 2005/0024528 A1 | 2/2005 | Kurosawa | |
| 2005/0024529 A1 | 2/2005 | Kurosawa | |
| 2005/0025475 A1 | 2/2005 | Kurosawa | |
| 2005/0025479 A1 | 2/2005 | Kurosawa | |

FOREIGN PATENT DOCUMENTS

JP 2003-69886 3/2003

OTHER PUBLICATIONS

U.S. Appl. No. 11/042,185, filed Jan. 26, 2005.
"Characteristics of Stainless Steel: A Comparison with Other Materials", Japanese Stainless Steel Association, downloaded from http://www.jssa.gr.jp, including a date thereon of Jan. 21, 2005, together with a partial English language translation of the same.

* cited by examiner

*Primary Examiner*—Ngoc-Yen Vu
*Assistant Examiner*—John Morehead
(74) *Attorney, Agent, or Firm*—Greenblum & Bernstein, P.L.C.

(57) ABSTRACT

A digital camera includes a mirror box having a lens mount to which a photographing lens is mounted; an image pick-up device having an imaging surface for capturing an object image which is focused on the imaging surface through the photographing lens; and a frame positioned inside the digital camera body, the mirror box and the image pick-up device being mounted to the frame. The mirror box is mounted to a surface of the frame. The image pick-up device is mounted to the surface of the frame via at least one support member positioned between the mirror box and the image pick-up device. A ratio of a distance from the lens mount to the frame and a length of the support member is substantially equal to a ratio of a linear expansion coefficient of the support member and a linear expansion coefficient of the mirror box.

18 Claims, 7 Drawing Sheets

DIGITAL CAMERA INCLUDING DEFOCUS PREVENTION

BACKGROUND OF THE INVENTION

1. Field of the Invention

The present invention relates to a digital camera including an image pick-up device such as a CCD image sensor, and more specifically relates to such a camera having a structure preventing defocusing which may be caused by heat produced by the image pick-up device and/or ambient temperature variations of the camera from occurring.

2. Description of the Related Art

In digital cameras including an image pick-up device such as a CCD image sensor, a mirror-box fixing structure wherein a main frame in a camera body is made of a material having a high stiffness such as a stainless steel, a resin-molded or die-cast mirror box is fixed to the front of the main frame, and the image pick-up device is fixed to the back of the mirror box, has been proposed for miniaturization and weight reduction of the camera. FIG. 8A shows a schematic view of a digital camera having such a mirror-box fixing structure. This digital camera is provided with a main frame 110 having an L-shaped vertical cross section. The main frame 110 is composed of a back plate 111 and a bottom plate 112 which are made of stainless steel plate and formed separately or integrally. A die-cast mirror box assembly 120 is fixed on the main frame 110 to be supported thereby. The mirror box assembly 120 is constructed so that various kinds of components such as a mirror box 121 and a pentagonal prism 123 are mounted to the mirror box assembly 120 and so that a lens mount 102 to which a photographing lens (not shown) is detachably attached is provided on the front of the mirror box 121. In addition, the main frame 110 is provided on the back plate 111 with an aperture 111a through which the interior of the mirror box assembly 120 is exposed to the outside on the rear side thereof, and an image pick-up device 130 is fixed to a rear surface of the back plate 111 to face the aperture 111a. This arrangement makes it possible to miniaturize the camera and reduce weight of the camera while increasing the strength of the camera body by a greater degree than in the case where the whole camera body is die-cast of aluminum or molded out of resin.

In digital cameras using a CCD image sensor as an image pick-up device, the temperature of the CCD image sensor rises excessively due to the driving current supplied thereto if the CCD image sensor operates continuously. This temperature rise increases the dark current in the CCD image sensor, thus causing an increase in noise of the image captured by the CCD image sensor. To prevent this problem of image deterioration from occurring, a technology for making the heat that is produced by the CCD image sensor transferred to the camera body to dissipate the heat therefrom has been proposed in Japanese laid-open patent publication No. 2003-69886.

The digital camera shown in FIG. 8A has adopted such a conventional technology; the heat produced by the CCD image sensor 130 is transferred to the main frame 110 to be dissipated from the main frame 110 so that the temperature of the CCD image sensor is prevented from rising excessively to thereby prevent image quality from deteriorating. However, if the temperature of the main frame 110 rises by the heat which is produced by the CCD image sensor 130 and transferred from the CCD image sensor 130 to the main frame 110 and/or by ambient temperature variations, heat expansion of the main frame 110 occurs both in a direction of the thickness of the main frame and in a direction along a surface thereof as shown by chain lines in FIG. 8B. At the same time, the heat transferred to the main frame 110 is partly transferred to the mirror box assembly 120 that is fixed to the main frame 110. Die-cast aluminum or molded resin which is used as a material of the mirror box 121 has a greater thermal conductivity than the main frame 110, and therefore not only the main frame 110 but also the mirror box 121 expand by the heat transferred from the CCD image sensor 130 via the main frame 110. Therefore, heat expansion of each of the main frame 110 and the mirror box assembly 120 occurs in the optical axis direction (horizontal direction as viewed in FIGS. 8A and 8B). Specifically, the imaging surface (front surface) of the CCD image sensor 130 deviates rearward in the optical axis direction from its original position by an amount of movement corresponding to the thermal expansion of the thickness of the main frame 110 in the optical axis direction in the main frame 110, while the front surface (lens mounting surface) of the lens mount 102 moves forward in the optical axis direction by an amount of movement corresponding to the thermal expansion of the mirror box 121 in the optical axis direction in the mirror box assembly 120. As a result of these positional deviations, the distance between the imaging surface of the CCD image sensor 130 and the front surface of the lens mount 102 in the optical axis direction varies depending on the heat transferred to the main frame 110 and the mirror box 121, and accordingly, defocusing occurs in the image focused on the CCD image sensor 130.

In addition, a bottom portion of the mirror box assembly 120 is fixed to the bottom wall 112 by set screws and the like, and is therefore restrained from expanding thermally by a greater force than an upper portion of the mirror box assembly 120 so that the front surface of the lens mount 102 tilts relative to a plane orthogonal to a photographing optical axis O depending on a degree of the thermal expansion of the mirror box assembly 120 as shown in FIG. 8B. Consequently, the photographing optical axis O tilts downwards, and accordingly defocusing partially occurs in the image focused on the CCD image sensor 130.

SUMMARY OF THE INVENTION

The present invention provides a digital camera in which defocusing, caused by heat produced by the image pick-up device and/or ambient temperature variations of the camera, from occurring to thereby improve imaging performance characteristics of the image pick-up device.

According to an aspect of the present invention, a digital camera is provided, including a mirror box having a lens mount to which a photographing lens is mounted; an image pick-up device having an imaging surface for capturing an object image which is focused on the imaging surface through the photographing lens; and a frame positioned inside the digital camera body, the mirror box and the image pick-up device being mounted to the frame. The mirror box is mounted to a surface of the frame. The image pick-up device is mounted to the surface of the frame via at least one support member positioned between the mirror box and the image pick-up device. A ratio of a distance from the lens mount to the frame in an optical axis direction and a length of the support member in the optical axis direction is substantially equal to a ratio of a linear expansion coefficient of the support member and a linear expansion coefficient of the mirror box.

It is desirable for the support member to include a flat portion positioned between the frame and the image pick-up device; and a first and second projecting portions which project in opposite directions away from each other from front and rear surfaces of the flat portion to be fitted into a first hole formed on a holding member to which the image pick-up device is directly fixed and a second hole formed on the frame, respectively.

It is desirable for the flat portion to be formed in a disc shape.

It is desirable for at least one of the first and second projecting portions to have a substantially arrow-shaped cross section.

It is desirable for the support member to be made of resin.

It is desirable for the support member to include a plurality of support members.

It is desirable for the frame to include a back plate lying in a plane orthogonal to the optical axis; and a bottom plate extending in the optical axis direction, wherein the mirror box is mounted on the bottom plate with a rear surface of the mirror box being fixed to the back plate, and a rear surface of the image pick-up device is supported by the back plate via the support member.

It is desirable for the image pick-up device to include one of a CCD image sensor and a CMOS image sensor.

It is desirable for the following equation to be satisfied:

$$L1 \times \alpha 1 \approx L2 \times \alpha 2$$

wherein L1 represents the length of the mirror box in the optical axis direction, L2 represents the length of the support member in the optical axis direction, α1 represents the linear expansion coefficient of the mirror box, and α2 represents the linear expansion coefficient of the support member.

It is desirable for the mirror box to be die-cast of aluminum, and the support member to be made of a polyolefin, wherein the following equation is satisfied:

$$L1:L2 \approx 5:1 \text{ through } 10:1.$$

It is desirable for the mirror box to be made of a polycarbonate resin, and the support member to be made of a polyolefin, wherein the following equation is satisfied:

$$L1:L2 \approx 5:1 \text{ through } 10:1.$$

It is desirable for the digital camera to be an SLR type in which different types of interchangeable lenses can be selectively mounted to the lens mount.

It is desirable for at least one camera mechanism for performing an image capturing operation be integrally mounted to the mirror box.

It is desirable for the camera mechanism to include at least one of an AF mechanism, a shutter mechanism and a diaphragm drive mechanism.

It is desirable for the digital camera to include a quick-return mirror installed in the mirror box.

It is desirable for the back plate and the bottom plate to be joined together to have an L-shaped vertical cross section.

It is desirable for the frame to be made of a hard metal.

In an embodiment, an SLR digital camera is provided, including an image pick-up device for electronically capturing an object image; and a mirror box having a lens mount provided in the SLR digital camera body immediately behind an interchangeable lens detachably mounted to the lens mount. The mirror box and the image pick-up device are mounted to a common frame provided in the SLR digital camera body. The mirror box is mounted to a surface of the common frame. The image pick-up device is mounted to the surface of the common frame via at least one support member provided between the mirror box and the image pick-up device. A ratio of a distance from the lens mount to the frame in an optical axis direction and a length of the support member in the optical axis direction is substantially equal to a ratio of a linear expansion coefficient of the support member and a linear expansion coefficient of the mirror box.

According to the present invention, the deterioration of image quality caused by an increase in temperature of the image pick-up device is prevented from occurring to improve imaging performance characteristics of the image pick-up device by making the heat that is produced by the image pick-up device transfer to the main frame to dissipate the heat therefrom, while the positional deviation of the lens mount on the mirror box and the positional deviation of the imaging surface of the image pick-up device which are caused by thermal expansion/contraction are made the same as each other, so that the distance between the lens mount and the imaging surface of the image pick-up device is maintained constant even if the mirror box and the frame expand or contract due to heat produced by the image pick-up device or ambient temperature variations. Accordingly, it possible to prevent defocusing from occurring in the image focused on the image pick-up device.

The present disclosure relates to subject matter contained in Japanese Patent Applications No. 2004-18076 (filed on Jan. 27, 2004) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
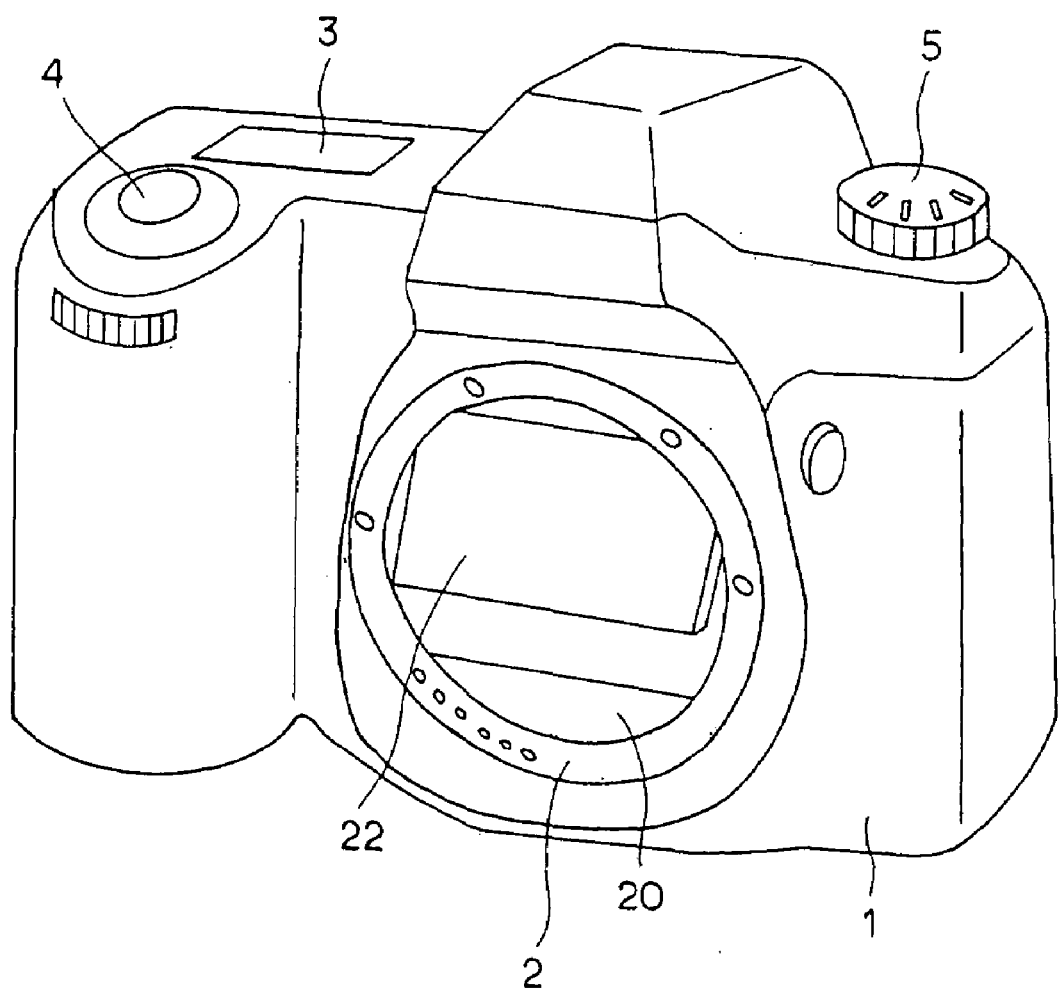
FIG. 1 is a perspective outline view of an embodiment of a digital camera (camera body) according to the present invention.

FIG. 1 is a perspective outline view of an embodiment of an SLR digital camera to which the present invention is applied, viewed obliquely from the right front side of the digital camera. The digital camera 100 that is constructed as an SLR digital camera is provided on the front of a camera body 1 thereof with a lens mount (lens mount ring) 2 to which an interchangeable lens (not shown) is detachably attached. The digital camera 100 is provided on top of the camera body 1 with an LCD indicating portion 3, a release button 4 and a select dial (dial switch) 5.

Figure 2:
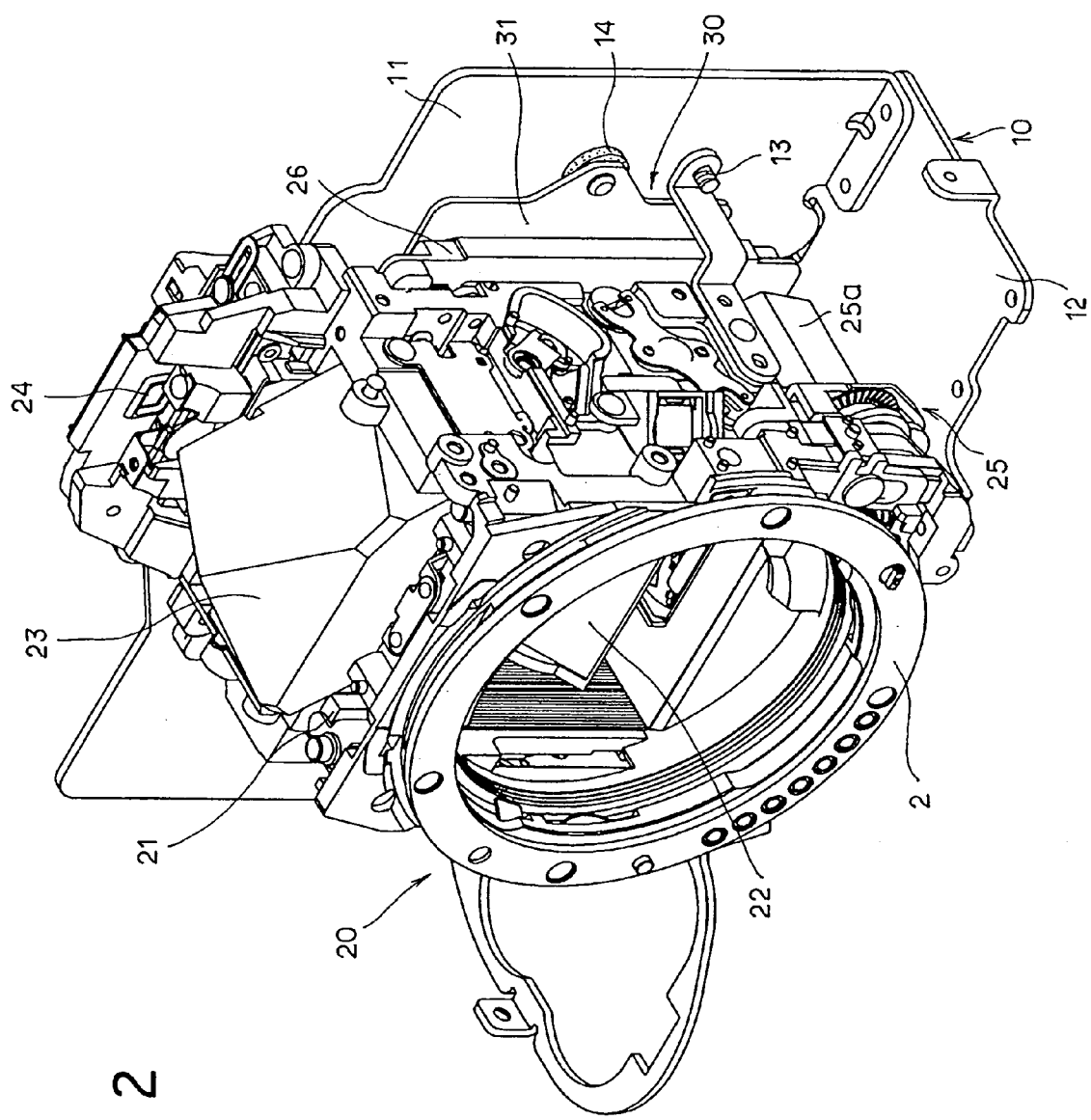
FIG. 2 is a perspective view of an internal structure of the digital camera shown in FIG. 1, viewed obliquely from the right front side thereof.
Figure 3:
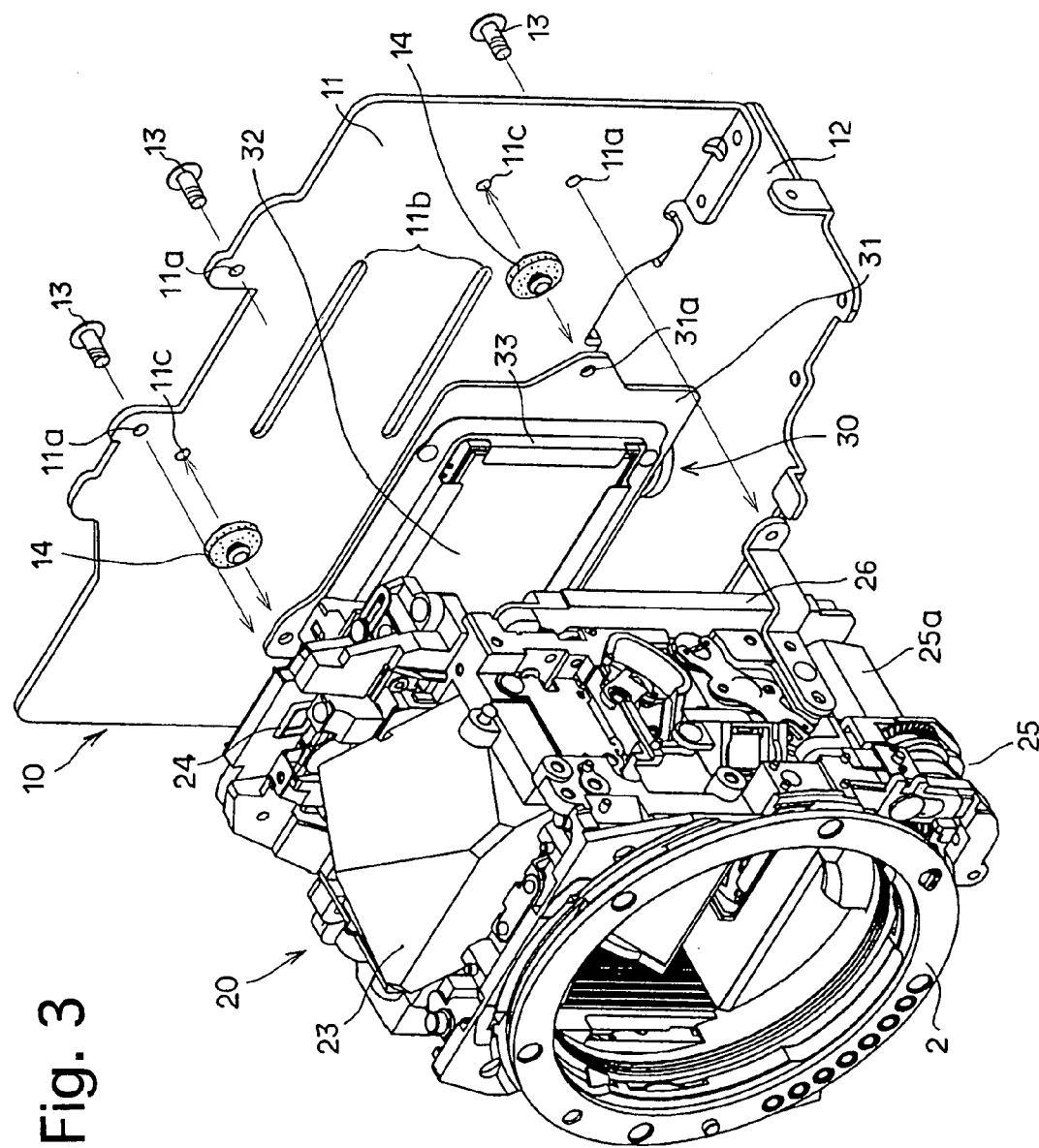
FIG. 3 is an exploded perspective view of the internal structure of the digital camera shown in FIG. 2, viewed obliquely from the right front side thereof.

FIG. 2 is a perspective view of components of an internal structure of the digital camera 100 that include a main frame 10, a mirror box assembly 20 and a CCD unit 30, and FIG. 3 is an exploded perspective view of the internal structure of the digital camera 100 shown in FIG. 2. The main frame 10 is made of metal plate having a high stiffness such as a stainless steel, and consists of a back plate 11, a bottom plate 12 and two side plates (a right-side plate and a left-side plate; not shown) which are joined together by swaging or welding. Specifically, the back plate 11 and the bottom plate 12 are joined together to have an L-shaped vertical cross section. The back plate 11 extends vertically, and the bottom plate 12 is elongated horizontally along the bottom edge of the back plate 11, and extends in an optical axis direction (direction of the optical axis O; horizontal direction as viewed in FIG. 6). The mirror box 21 that serves as a major part of the mirror box assembly 20 is die-cast of aluminum or made of resin such as a fiber-glass reinforced polycarbonate resin, and is formed into a rectangular box shape as a whole. The lens mount 2 is formed integral with the front of the mirror box 21.

A quick-return mirror (main mirror) 22 is installed in the mirror box 21. A pentagonal prism 23, a photometering sensor 24 and an eyepiece optical system (not shown) are mounted on top of the mirror box 21, and an AF drive mechanism (camera mechanism) 25 including an AF motor 25a is fixed to a bottom portion of the mirror box 21. A shutter unit (shutter mechanism/camera mechanism) 26 including a focal-plane shutter and a shutter drive mechanism is fixed to the back of the mirror box 21, while a diaphragm drive mechanism (camera mechanism) 27 and a mirror-drive/shatter-charge mechanism 28 including a mirror-drive/shutter-charge motor 28a for driving the main mirror 22 are fixed to a left side face of the mirror box 21. The mirror box 21 and the AF drive mechanism 25, the shutter unit 26, the diaphragm drive mechanism 27 and the mirror-drive/shatter-charge mechanism 28a are elements of the mirror box assembly 20. The mirror box assembly 20 is mounted on top of the bottom plate 12 of the main frame 10 that is positioned in front of the back plate 11 of the main frame 10, and is fixed to the back plate 11 at a plurality of points by a plurality of set screws 13 which are screwed into the back of the mirror box assembly 20 through a corresponding plurality of through holes 11a formed on the back plate 11. In this fixing state of the mirror box assembly 20 to the main frame 10, heat expansion of the mirror box assembly 20 occurs in a manner as if to slide on the bottom plate 12 in a direction parallel to the optical axis O when the mirror box assembly 20 expands linearly in the optical axis direction due to temperature variations.

Figure 4:
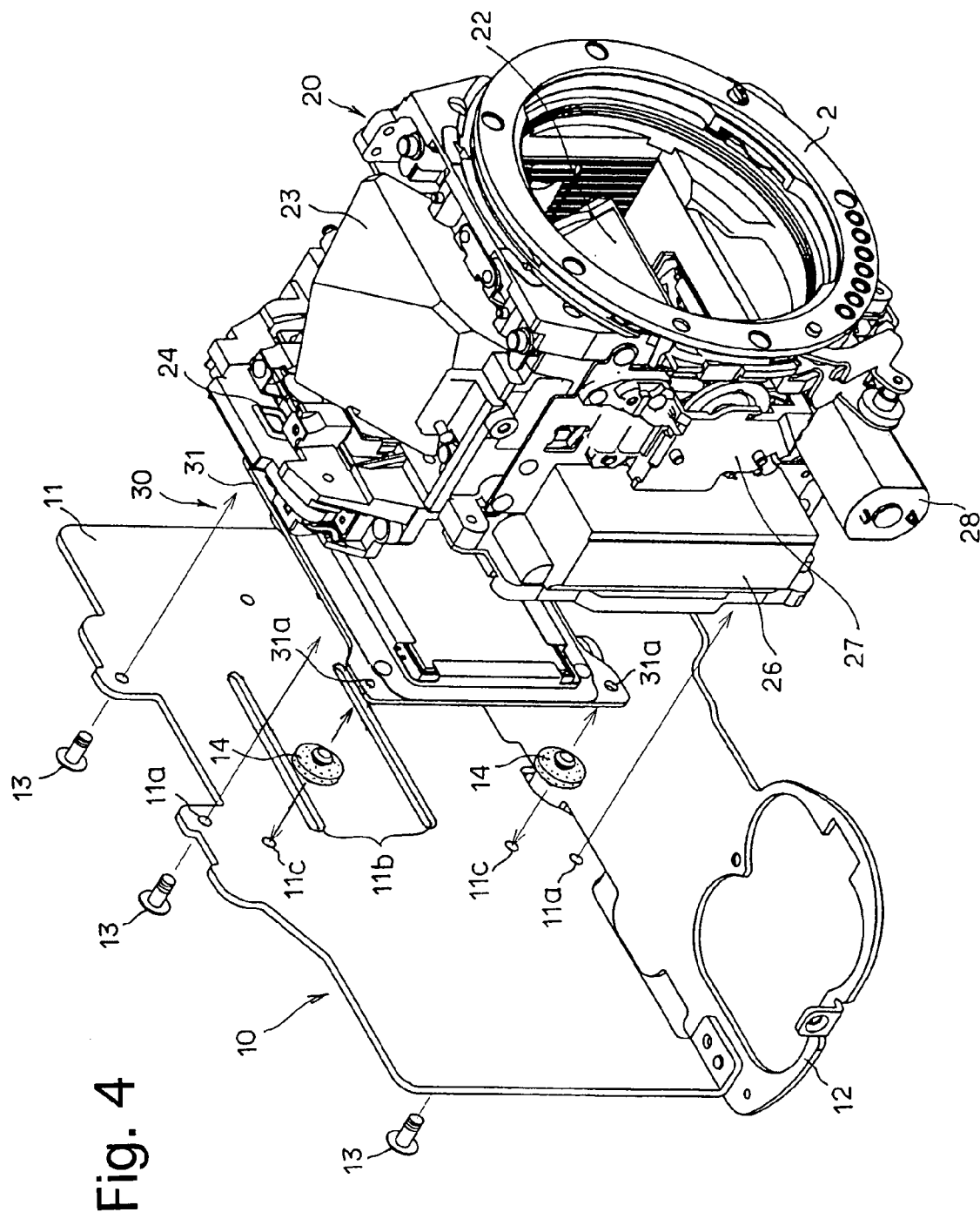
FIG. 4 is an exploded perspective view of the internal structure of the digital camera shown in FIG. 2, viewed obliquely from the left front side thereof.
Figure 5:
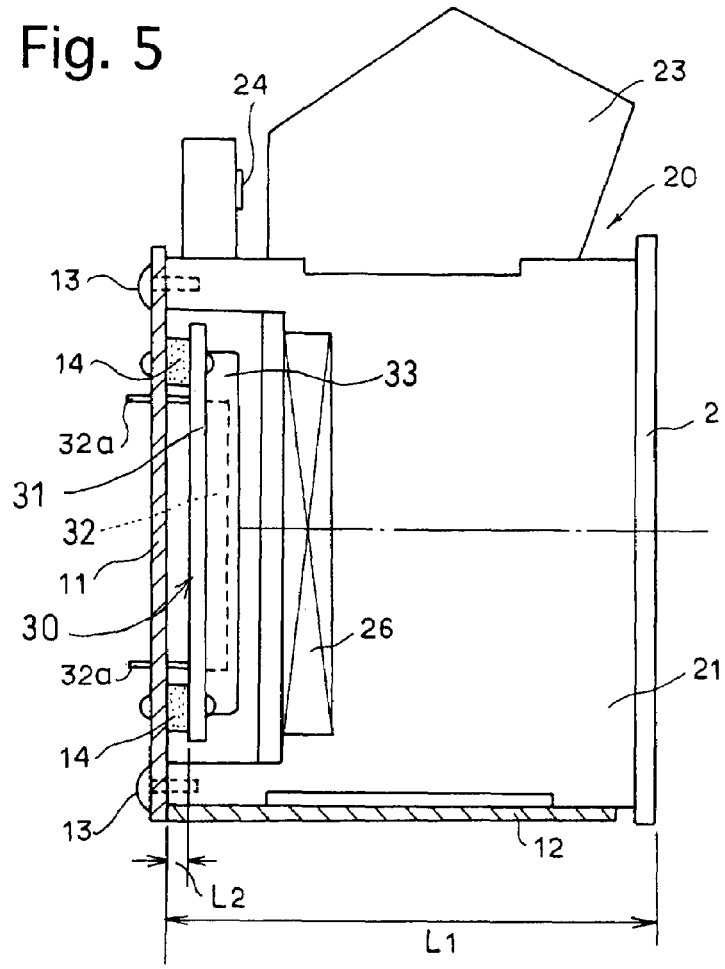
FIG. 5 is a schematic vertical sectional view of the internal structure of the digital camera shown in FIG. 2.

As shown in a vertical cross sectional view of the mirror box assembly 20 in FIG. 5, taken along a vertical plane at a substantially center of the mirror box assembly 20 in a lateral direction thereof, the CCD unit 30 is positioned behind the shutter unit 26, which is positioned on the back of the mirror box 21, and is fixed to the back plate 11 of the main frame 10 to be supported thereby. As clearly seen in FIGS. 3 and 4, the CCD unit 30 is provided on a CCD base plate (holding member) 31 thereof with a CCD chip (CCD image sensor) 32 serving as an image pick-up device, the outer edge of which is held by a rectangular frame 33 fixed to the CCD base plate 31. The CCD base plate 31 is provided at three different points thereon with three fixing holes (through holes) 31a, and is fixed to a front surface of the back plate 11 via three CCD-unit support members 14 which are engaged in the three fixing holes 31a of the CCD base plate 31, respectively. Two external lead arrays 32a (see FIG. 5; not shown in FIGS. 3 and 4) which are electrically connected to the CCD chip 32 project rearward from the back of the CCD base plate 31 through two slots 11b formed on the back plate 11 so that the respective tips of the external lead arrays 32a project rearward from the base plate 11 as shown in FIG. 5.

Figure 6A:
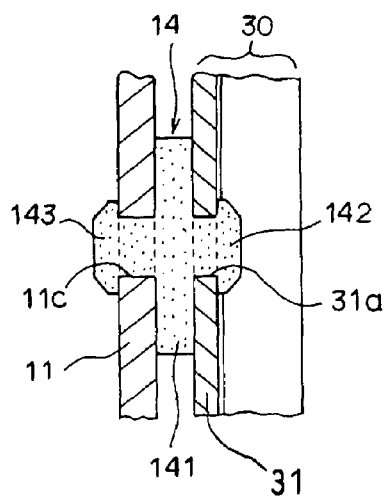
FIG. 6A is a perspective view of a CCD-unit support member.
Figure 6B:
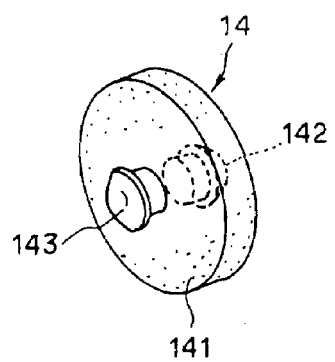
FIG. 6B is a cross sectional view of the CCD-unit support member shown in FIG. 6A, showing a state where the CCD-unit support member is installed between a back plate of a main frame and a CCD unit.

FIG. 6A is a perspective view of each of the three CCD-unit support members 14. The CCD-unit support member 14 is molded out of resin as an integral member, and is provided with a disc portion 141, a front projecting portion 142 and a rear projecting portion and 143 (two projecting portions) which are coaxially arranged on an axis of the disc portion 141. The front projecting portion 142 and the rear projecting portion 143 project in opposite directions away from each other from the respective centers of the front surface and the rear surface of the disc portion 141 in a direction of the thickness of the disc portion 141. Each of the front and rear projecting portions 142 and 143 has a substantially arrow-shaped cross section for self-locking. In addition, the rear projecting portion 143 of each CCD-unit support member 14 is fitted into an associated support hole (through hole) 11c formed on the back plate 11, while the front projecting portion 142 of each CCD-unit support member 14 is fitted into an associated support hole (through hole) 31a formed on the CCD base plate 31. Due to the engagement of the front projecting portion 142 with the associated support hole 31a and the engagement of the rear projecting portion 143 with the associated support hole 11c, each CCD-unit support member 14 is fixedly installed between the back plate 11 and the CCD base plate 31 in a state where the disc portion 141 is held between the back plate 11 and the CCD base plate 31 as shown in FIG. 6B. In this fixed state of the CCD unit 30, the front surface of the CCD unit 30 is not in contact with the back surface of the mirror box assembly 20, specifically with the shutter unit 26. Namely, a slight gap is secured between the CCD block 30 and the mirror box assembly 20 in the optical axis direction.

As shown in FIG. 5, each CCD-unit support member 14 is shaped so that the thickness thereof (i.e., an axial length L2 of the disc portion 141 in the optical axis direction) corresponds to a ratio from one tenth through one fifth of the length of the mirror box assembly 20 in the optical axis direction, i.e., of a distance L1 between the front surface of the back plate 11 to the front surface of the lens mount 2 in the optical axis direction. In addition, each CCD-unit support member 14 is made of a polyolefin having a linear expansion coefficient approximately five to ten times greater than the linear expansion coefficient of die-cast aluminum or molded resin which is used as a material of the mirror box 21.

Supposing the linear expansion coefficient of the mirror box 21 is $\alpha 1$, the linear expansion coefficient $\alpha 1$ when die-cast aluminum is used as a material of the mirror box 21 is approximately $2.3 \times 10E-5/°$ C., and the linear expansion coefficient $\alpha 1$ when polycarbonate resin is used as a material of the mirror box 21 is $2.7 \times 10E-5/°$ C. Furthermore, supposing the linear expansion coefficient of the CCD-unit support member 14 is $\alpha 2$, the linear expansion coefficient $\alpha 2$ when polyacetal (a polyolefin compound) is used as a material of the CCD-unit support member 14 is $11 \times 10E-5/°$ C., the linear expansion coefficient $\alpha 2$ when polyethylene is used as a material of the CCD-unit support member 14 is 16 through $18 \times 10E-5/°$ C., and the linear expansion coefficient α2 when a polybutylene terephthalate is used as a material of the CCD-unit support member 14 is 9.4×10E−5/° C.

Figure 7A:
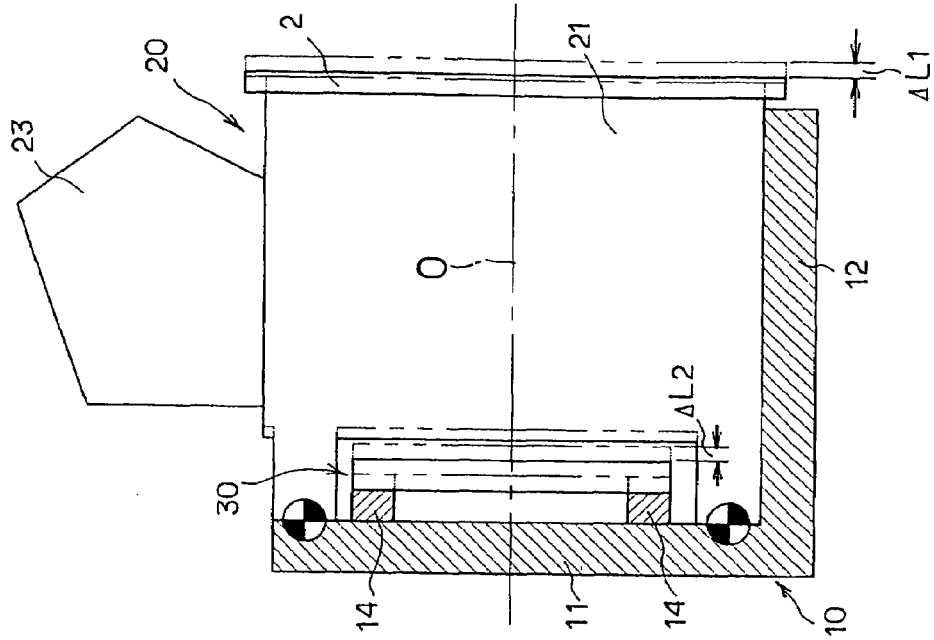
FIGS. 7A and 7B are schematic diagrams for illustrating an operation ensuring an in-focus state.
Figure 7B:
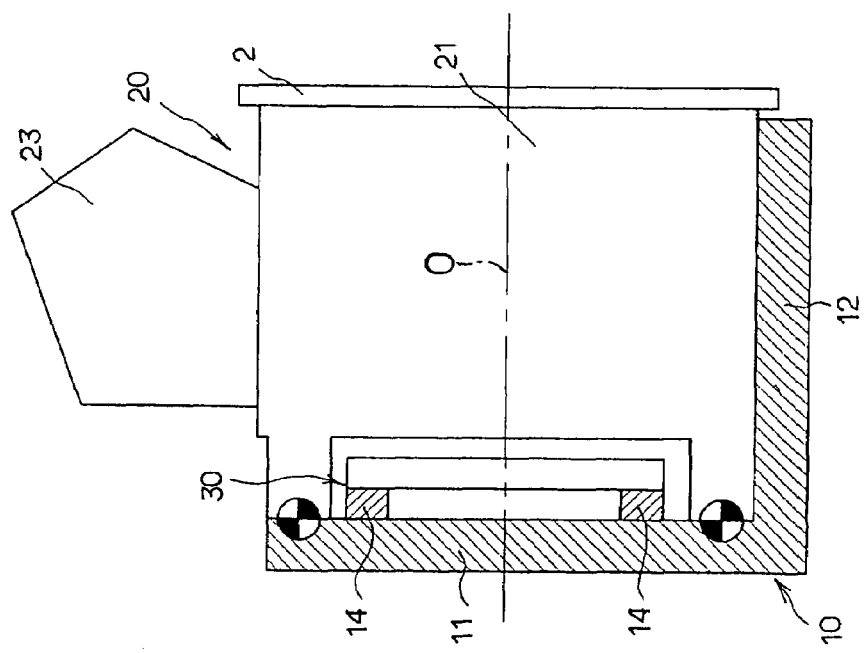
Figure 8A:
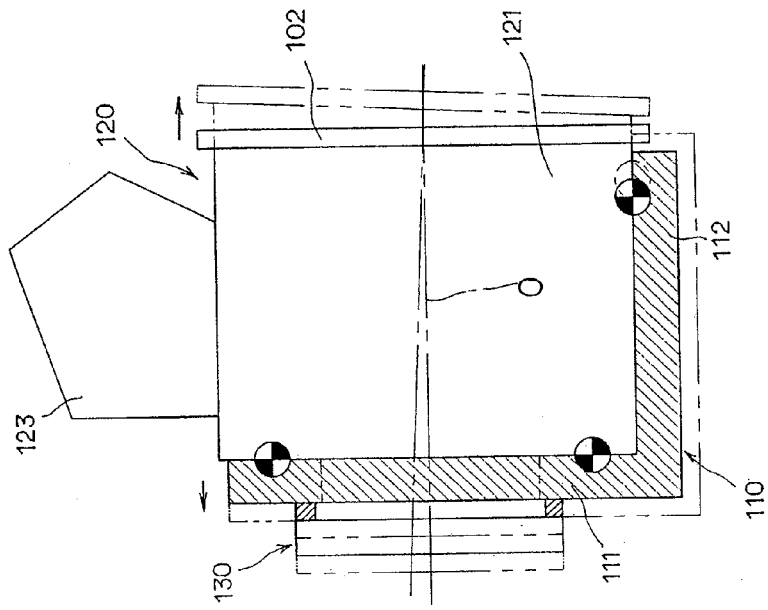
FIGS. 8A and 8B are schematic diagrams for illustrating a process of the occurrence of defocusing in a conventional digital camera.
Figure 8B:
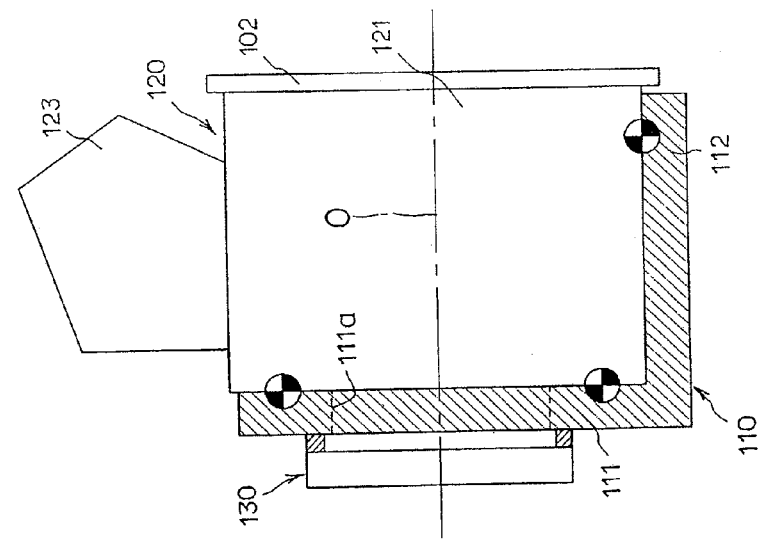

In the above illustrated embodiment of the digital camera, the distance between the front surface of the lens mount 2 and the imaging surface of the CCD chip 32 in the CCD unit 30 in the optical axis direction is determined to correspond to a predetermined distance for focusing an image on the imaging surface of the CCD chip 32 through a photographing lens (interchangeable lens) mounted to the lens mount 2 in a state where the digital camera 100 is not in use in a normal range of temperatures as shown in FIG. 7A. Therefore, when a picture is taken in this state, an object image which is to be focused through the photographing lens is focused on the imaging surface of the CCD chip 32. In addition, high imaging performance characteristics of the CCD chip 32 can be attained because the CCD unit 30 is in a normal range of temperature.

If the digital camera 100 is used for a long period of time, the temperature of the CCD block 30 rises due to heat produced by the CCD chip 32. Although this temperature rise has the potential to deteriorate the imaging performance characteristics of the CCD chip 32, the heat produced by the CCD chip 32 is transferred from the CCD base plate 31 to the back plate 11 via the CCD-unit support member 14 to be dissipated from the back plate 11, and is eventually transferred to the main frame 10 entirely (which includes the bottom frame 12) to be dissipated from the whole main frame 10, so that imaging performance characteristics of the CCD chip 32 can be prevented from deteriorating. Additionally, if heat expansion of each of the main frame 10 and the mirror box 21 occurs due to the heat transferred to the main frame 10, heat expansion of the mirror box 21 occurs in the optical axis direction to vary the position of the lens mount 2 in the optical axis direction (usually move the lens mount 2 forward in the optical axis direction). At the same time, heat expansion of the disc portion 141 of the CCD-unit support member 14 also occurs in a direction of the thickness thereof, so that the imaging surface of the CCD chip 32 in the CCD unit 30 also moves forward in the optical axis direction.

Assuming that the temperature of the mirror box assembly 20 rises by ΔT from ordinary temperature, that L1 represents the length of the mirror box assembly 20 in the optical axis direction (i.e., the distance from the rear surface of the mirror box assembly 20 which is fixed to the front surface of the back plate 11 of the main frame 10 to the front surface of the lens mount 2 in the optical axis direction), and that α1 represents the linear expansion coefficient of the mirror box 21, an increase by ΔL1 in length of the mirror box assembly 20 forwardly in the optical axis direction due to linear expansion of the mirror box assembly 20 is represented by the following equation:

$$\Delta L1 = L1 \times \alpha 1 \times \Delta T.$$

In other words, the lens mount 2 is moved forward in the optical axis direction by ΔL1.

Supposing that L2 represents the thickness of the disc portion 141 of the CCD-unit support member 14 and that α2 represents the linear expansion coefficient of the CCD-unit support member 14, an increase ΔL2 in length of the disc portion 141 in the optical axis-direction due to linear expansion of the CCD-unit support member 14 is represented by the following equation:

$$\Delta L2 = L2 \times \alpha 2 \times \Delta T.$$

ΔL2 corresponds to an amount of forward movement by which the imaging surface of the CCD chip 32 in the CCD unit 30 is moved in the optical axis direction.

In the illustrated embodiment, the linear expansion coefficient α2 of the CCD-unit support member 14 is approximately five to ten times greater than the linear expansion coefficient α1 of the mirror box 21 (i.e., α1:α2=1:5 through 1:10) while the thickness L2 of the disc portion 141 corresponds to a ratio of one tenth through one fifth of the length L1 of the mirror box assembly 20 in the optical axis direction (i.e., L1:L2=5:1 through 10:1). Therefore, the value "L1×α1" and the value "L2×α2" becomes substantially equal to each other, and thereby the following equation is derived:

$$\Delta L1 \approx \Delta L2.$$

Accordingly, the amount of movement of the lens mount 2 in the optical axis direction and the amount of movement of the imaging surface of the CCD chip 32 in the optical axis direction become the same as each other. Therefore the distance between the imaging surface of the CCD chip 32 in the CCD chip 30 and the front surface of the lens mount 2 is maintained substantially constant. Consequently, an in-focus state in which an object image captured through the photographing lens mounted to the lens mount 2 is focused on the imaging surface of the CCD chip 32 is maintained even if the temperature of the CCD unit 30 rises excessively.

Since the mirror box assembly 20 is not fixed to the bottom plate 12 of the main frame 10 by set screws or the like, heat expansion of the mirror box assembly 20 can occur in a manner as if to slide on the bottom plate 12 in a direction parallel to the optical axis O when the mirror box assembly 20 expands linearly in the optical axis direction due to temperature variation. According to this structure, the front surface of the lens mount 2 remains positioned orthogonally to the optical axis O, and accordingly an occurrence of partial defocusing of the image focused on the CCD chip 32 is prevented.

As can be understood from the foregoing, in the above illustrated embodiment of the digital camera, imaging performance characteristics of the CCD chip 32 do not deteriorate even if the CCD block 30 operates for a long period of time. Moreover, defocusing in the image focused on the imaging surface of the CCD chip 32 can be prevented from occurring whether the CCD block 30 operates for a long period of time or the ambient temperature of the camera varies. This makes it possible to capture high-quality object images.

Although the above descriptions are directed to the case where the temperature of the digital camera 100 rises an in-focus state in which an object image captured through the photographing lens mounted to the lens mount 2 is focused on the imaging surface of the CCD chip 32 is maintained, the present invention is also applicable to the case where the temperature of the digital camera 100 drops below ordinary temperature because heat-contraction of the CCD-unit support member 14 occurs at the same time as the heat-contraction of the mirror box assembly 20.

Although the CCD unit 30 is supported by the main frame 10 via the engagement of the front projecting portion 142 of each CCD-unit support member 14 with the associated support hole 31a and the engagement of the rear projecting portion 143 of each CCD-unit support member 14 with the associated support hole 11c in the above illustrated embodiment of the digital camera, the CCD unit 30 can be supported by the main frame 10 by bonding the CCD-unit support member to at least one of the CCD unit and the main frame. In this case, it is required that the adhesive for bonding the CCD-unit support member have excellent durability and reliability.

Although a combination of materials of the CCD-unit support member 14 and the mirror box 21 is determined so that the linear expansion coefficient of the CCD-unit support member 14 becomes approximately five to ten times greater than the linear expansion coefficient of the mirror box 21 in the above illustrated embodiment of the digital camera, any other combination of materials can be adopted by adjusting the thickness of the CCD-unit support member depending on the ratio between the linear expansion coefficient of the CCD-unit support member and the linear expansion coefficient of the mirror box 21 so long as the combination of materials is such that the respective moving amounts of the mirror box assembly and the CCD unit in the optical axis direction become the same as each other.

Although the CCD image sensor (CCD chip 32) is used as an image pick-up device in the above illustrated embodiment of the digital camera, the CCD image sensor can be replaced by any other solid-state image pick-up device such as a CMOS image sensor so long as the image pick-up device is a type in which image quality deteriorates due to the heat produced by the image pick-up device. For instance, the present invention can be applied to any digital camera using a CMOS image sensor.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A digital camera comprising:
   a mirror box having a lens mount to which a photographing lens is mounted;
   an image pick-up device having an imaging surface for capturing an object image which is focused on said imaging surface through said photographing lens; and
   a frame positioned inside the digital camera body, said mirror box and said image pick-up device being mounted to said frame,
   wherein said mirror box is mounted to a surface of said frame,
   wherein said image pick-up device is mounted to said surface of said frame via at least one support member positioned between said frame and said image pick-up device, and
   wherein a ratio of a distance from said lens mount to said frame in an optical axis direction and a length of said support member in said optical axis direction is substantially equal to a ratio of a linear expansion coefficient of said support member and a linear expansion coefficient of said mirror box.

2. The digital camera according to claim 1, wherein said support member comprises:
   a flat portion positioned between said frame and said image pick-up device; and
   a first and second projecting portions which project in opposite directions away from each other from front and rear surfaces of said flat portion to be fitted into a first hole formed on a holding member to which said image pick-up device is directly fixed and a second hole formed on said frame, respectively.

3. The digital camera according to claim 2, wherein said flat portion is formed in a disc shape.

4. The digital camera according to claim 2, wherein at least one of said first and second projecting portions has a substantially arrow-shaped cross section.

5. The digital camera according to claim 1, wherein said support member is made of resin.

6. The digital camera according to claim 2, wherein said support member comprises a plurality of support members.

7. The digital camera according to claim 1, wherein said frame comprises:
   a back plate lying in a plane orthogonal to said optical axis; and
   a bottom plate extending in said optical axis direction,
   wherein said mirror box is mounted on said bottom plate with a rear surface of said mirror box being fixed to said back plate, and
   wherein a rear surface of said image pick-up device is supported by said back plate via said support member.

8. The digital camera according to claim 1, wherein said image pick-up device comprises one of a CCD image sensor and a CMOS image sensor.

9. The digital camera according to claim 1, wherein the following equation is satisfied:

$$L1 \times \alpha1 \approx L2 \times \alpha2$$

wherein L1 represents the length of said mirror box in said optical axis direction;
L2 represents the length of said support member in said optical axis direction;
α1 represents said linear expansion coefficient of said mirror box; and
α2 represents said linear expansion coefficient of said support member.

10. The digital camera according to claim 9, wherein said mirror box is die-cast of aluminum, and said support member is made of a polyolefin, wherein the following equation is satisfied:

$$L1:L2 \approx 5:1 \text{ through } 10:1.$$

11. The digital camera according to claim 9, wherein said mirror box is made of a polycarbonate resin, and said support member is made of a polyolefin when the following equation is satisfied:

$$L1:L2 \approx 5:1 \text{ through } 10:1.$$

12. The digital camera according to claim 1, wherein said digital camera is an SLR type in which different types of interchangeable lenses can be selectively mounted to said lens mount.

13. The digital camera according to claim 1, wherein at least one camera mechanism for performing an image capturing operation is integrally mounted to said mirror box.

14. The digital camera according to claim 13, wherein said camera mechanism comprises at least one of an AF mechanism, a shutter mechanism and a diaphragm drive mechanism.

15. The digital camera according to claim 1, further comprising a quick-return mirror installed in the mirror box.

16. The digital camera according to claim 7, wherein said back plate and said bottom plate are joined together to have an L-shaped vertical cross section.

17. The digital camera according to claim 1, wherein said frame is made of a hard metal.

18. An SLR digital camera comprising:
   an image pick-up device for electronically capturing an object image; and a mirror box having a lens mount provided in the SLR digital camera body immediately behind an interchangeable lens detachably mounted to said lens mount, wherein said mirror box and said image pick-up device are mounted to a common frame provided in said SLR digital camera body, wherein said mirror box is mounted to a surface of said common frame, wherein said image pick-up device is mounted to said surface of said common frame via at least one support member provided between said frame and said image pick-up device, and wherein a ratio of a distance from said lens mount to said frame in an optical axis direction and a length of said support member in said optical axis direction is substantially equal to a ratio of a linear expansion coefficient of said support member and a linear expansion coefficient of said mirror box.

* * * * *